(12) United States Patent
Berger et al.

(10) Patent No.: US 8,645,628 B2
(45) Date of Patent: Feb. 4, 2014

(54) DYNAMICALLY SUPPORTING VARIABLE CACHE ARRAY BUSY AND ACCESS TIMES FOR A TARGETED INTERLEAVE

(75) Inventors: Deanna P. Berger, Poughkeepsie, NY (US); Michael F. Fee, Cold Spring, NY (US); Arthur J. O'Neill, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 12/822,341

(22) Filed: Jun. 24, 2010

(65) Prior Publication Data

US 2011/0320697 A1   Dec. 29, 2011

(51) Int. Cl.
*G06F 12/00*    (2006.01)

(52) U.S. Cl.
USPC ........... 711/127; 711/118; 711/150; 711/151; 711/152; 711/154; 711/167; 711/168

(58) Field of Classification Search
USPC ......... 711/118, 127, 150, 151, 152, 154, 167, 711/168
See application file for complete search history.

(56) References Cited

U.S. PATENT DOCUMENTS

| | | | | |
|---|---|---|---|---|
| 5,596,740 A | * | 1/1997 | Quattromani et al. | 711/157 |
| 5,862,360 A | * | 1/1999 | Meaney et al. | 711/151 |
| 6,043,697 A | | 3/2000 | Jang | |
| 6,990,207 B2 | | 1/2006 | Jang | |
| 7,225,306 B2 | * | 5/2007 | Tong | 711/157 |
| 7,609,540 B2 | | 10/2009 | Kang | |
| 8,074,010 B2 | * | 12/2011 | Hutson | 711/5 |
| 2005/0027942 A1 | * | 2/2005 | Ulrich | 711/130 |
| 2009/0083491 A1 | * | 3/2009 | Berger et al. | 711/131 |

* cited by examiner

*Primary Examiner* — Arpan P. Savla
(74) *Attorney, Agent, or Firm* — Fleit Gibbons Gutman Bongini & Bianco PL; Thomas Grzesik

(57) ABSTRACT

Various embodiments of the present invention manage access to a cache memory. In or more embodiments a request for a targeted interleave within a cache memory is received. The request is associated with an operation of a given type. The target is determined to be available. The request is granted in response to the determining that the target is available. A first interleave availability table associated with a first busy time associated with the cache memory is updated based on the operation associated with the request in response to granting the request. A second interleave availability table associated with a second busy time associated with the cache memory is updated based on the operation associated with the request in response to granting the request.

20 Claims, 9 Drawing Sheets

DYNAMICALLY SUPPORTING VARIABLE CACHE ARRAY BUSY AND ACCESS TIMES FOR A TARGETED INTERLEAVE

FIELD OF THE INVENTION

The present invention generally relates to microprocessors, and more particularly relates to high performance caches.

BACKGROUND OF THE INVENTION

Current designs for a large cache that comprises many individual instances of Embedded Dynamic Random Access Memory (EDRAM) macros generally pose problems that were not encountered by prior Static Random Access Memory (SRAM) based designs. In particular, EDRAM devices have programmable performance parameters such as access time and busy time that are used to balance manufacturing yield with improved performance. While the ability to vary these parameters provides operational flexibility, this ability results in additional complexity with regard to modeling the availability of the cache resources. However, current designs generally do not take into account these programmable performance parameters, which results in inefficient utilization of cache resources.

SUMMARY OF THE INVENTION

In one embodiment, a method for managing access to a cache memory is disclosed. The method comprises receiving a request for a targeted interleave within a cache memory. The request is associated with an operation of a given type. The target is determined to be available. The request is granted in response to the determining that the target is available. A first interleave availability model/table associated with a first busy time associated with the cache memory is updated based on the operation associated with the request in response to granting the request. A second interleave availability model/table associated with a second busy time associated with the cache memory is updated based on the operation associated with the request in response to granting the request.

In another embodiment, an information processing device for managing access to a cache memory is disclosed. The information processing device comprises a plurality of processing cores and at least one memory cache that is communicatively coupled to the plurality of processing cores. At least one cache controller is communicatively coupled to the at least one memory cache and the plurality of processing cores. The at least one cache controller is configured to perform to perform a method. The method comprises receiving a request for a targeted interleave within a cache memory. The request is associated with an operation of a given type. The target is determined to be available. The request is granted in response to the determining that the target is available. A first interleave availability model/table associated with a first busy time associated with the cache memory is updated based on the operation associated with the request in response to granting the request. A second interleave availability model/table associated with a second busy time associated with the cache memory is updated based on the operation associated with the request in response to granting the request.

In yet another embodiment, a tangible computer program product for managing access to a cache memory is disclosed. The tangible computer program product comprises a storage medium readable by a processing circuit and storing instructions for execution by the processing circuit for performing a method. The method comprises receiving a request for a targeted interleave within a cache memory. The request is associated with an operation of a given type. The target is determined to be available. The request is granted in response to the determining that the target is available. A first interleave availability model/table associated with a first busy time associated with the cache memory is updated based on the operation associated with the request in response to granting the request. A second interleave availability model/table associated with a second busy time associated with the cache memory is updated based on the operation associated with the request in response to granting the request.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 8 shows a portion of an interleave availability model/table representing how a fetch operation targeting an interleave affects blocking in a store interleave model/table for a 3 cycle busy according to one embodiment of the present invention;

FIG. 9 illustrates how a fetch interleave availability model/table is affected by a store targeting ILV6 for a 3 cycle busy time according to one embodiment of the present invention;

FIG. 10 illustrates how a fetch interleave availability model/table is affected by a store targeting ILV6 for a 4 cycle busy time according to one embodiment of the present invention;

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one as or more than one. The term plurality, as used herein, is defined as two as or more than two. Plural and singular terms are the same unless expressly stated otherwise. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Operating Environment

Figure 1:
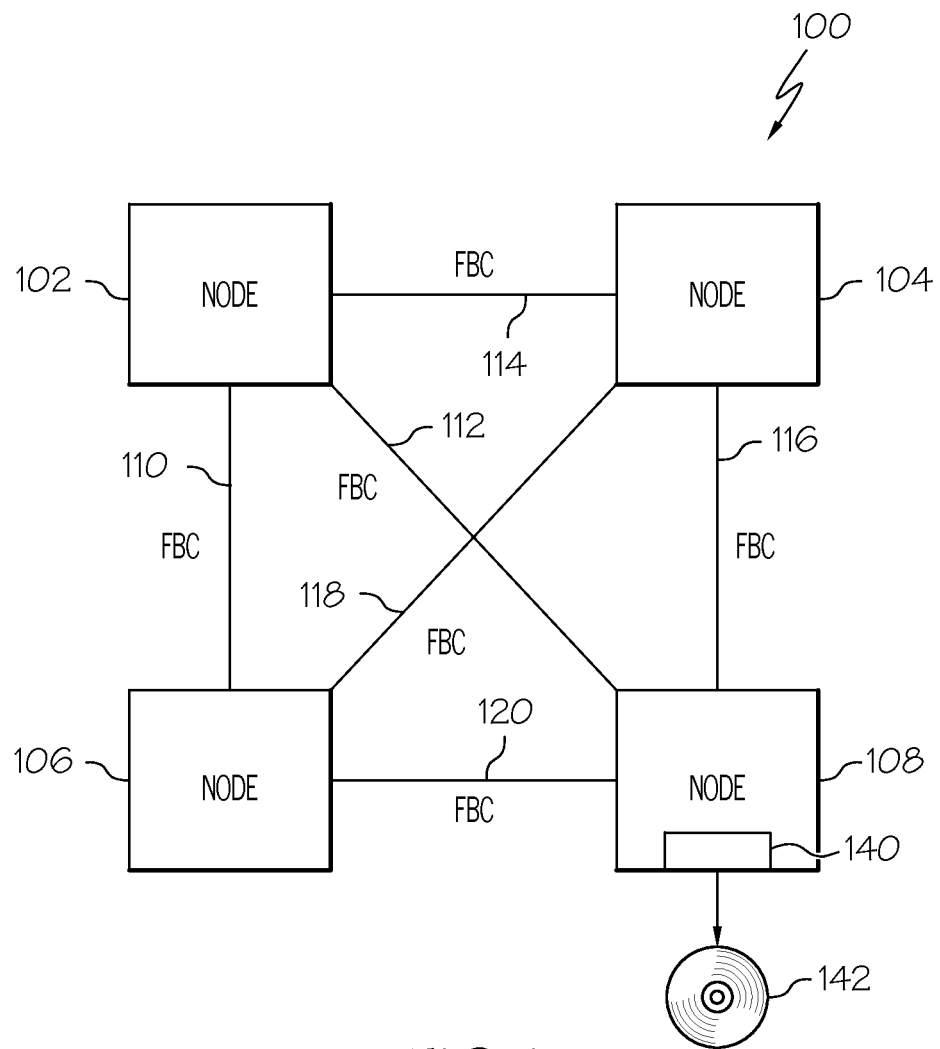
FIG. 1 is a block diagram illustrating one example of a computing system according to one embodiment of the present invention.
Figure 2:
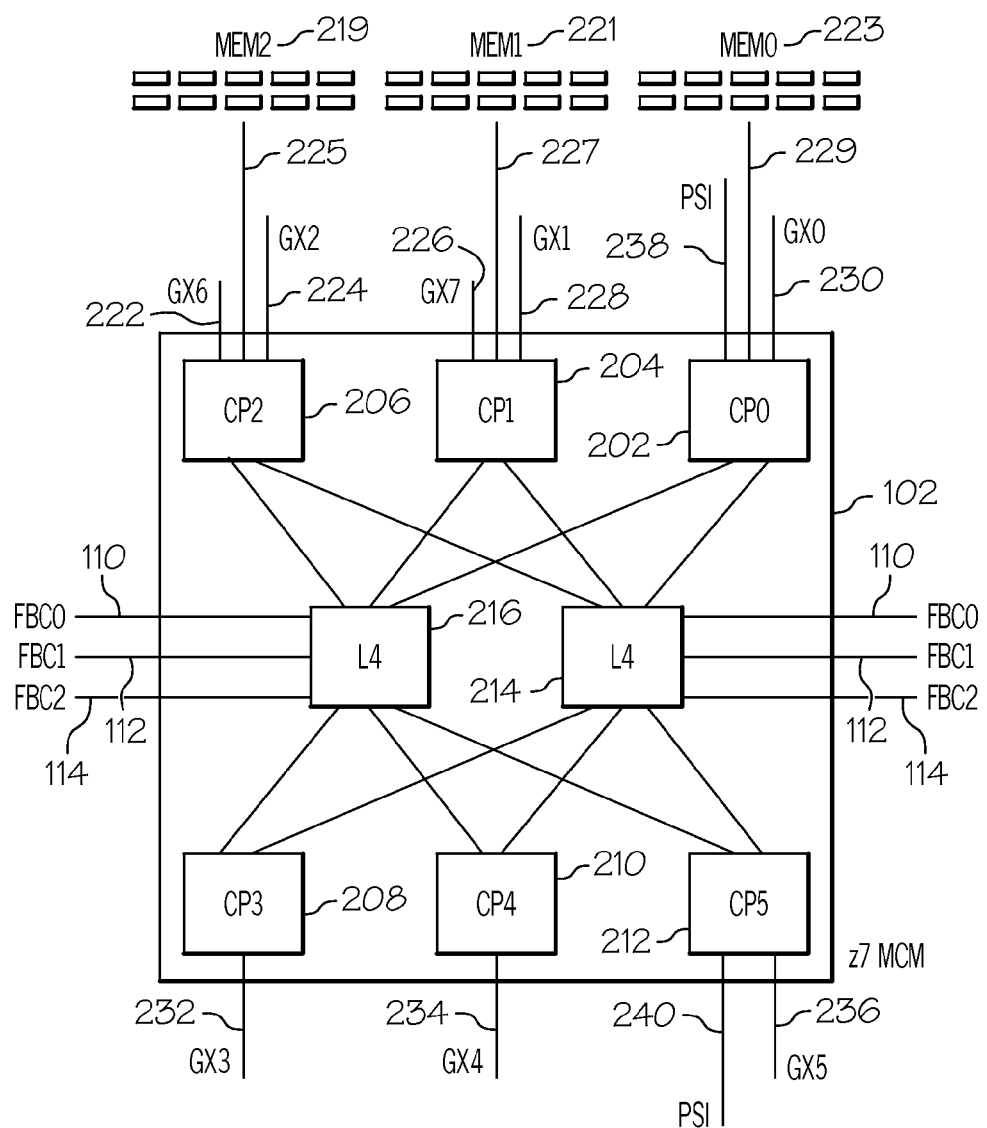
FIG. 2 is a block diagram illustrating one example of a computing node within the computing system of FIG. 1 according to one embodiment of the present invention.
Figure 3:
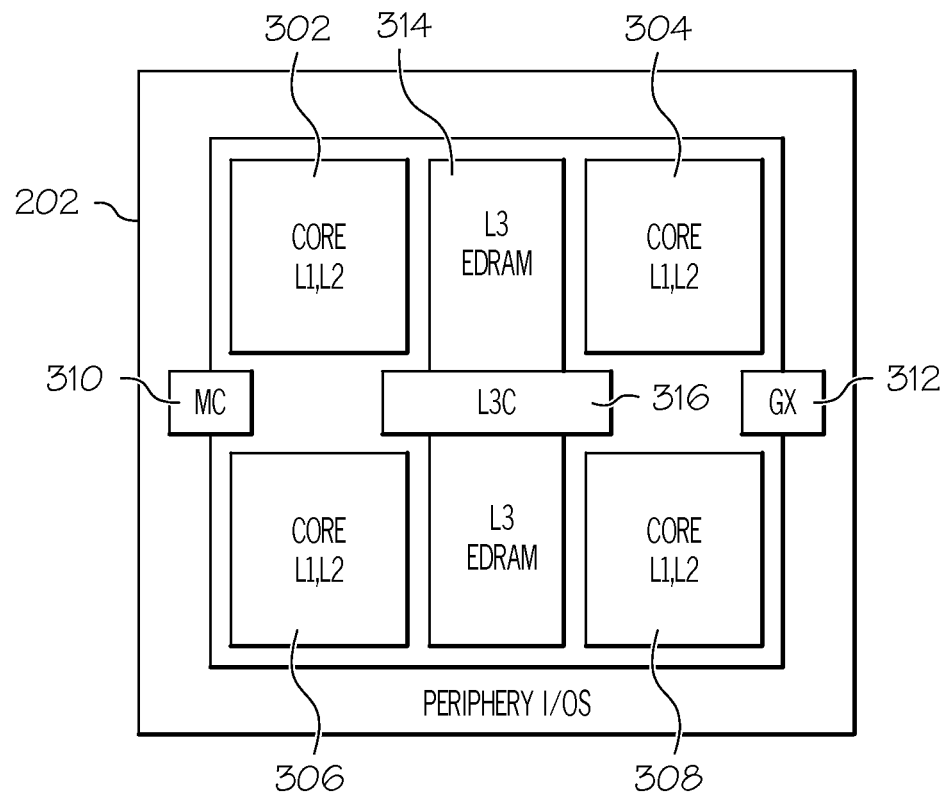
FIG. 3 is a block diagram illustrating one example of a processing chip within the node of FIG. 1 according to one embodiment of the present invention.

FIGS. 1-3 show one example of an operating environment applicable to various embodiments of the present invention. In particular, FIG. 1 shows a computing system 100 that comprises a plurality of computing nodes 102, 104, 106, 108. Each of these computing nodes 102, 104, 106, 108 are communicatively coupled to each other via one or more communication fabrics 110, 112, 114, 116, 118, 120. Communication fabric includes wired, fiber optic, and wireless communication connected by one or more switching devices and port for redirecting data between computing nodes. Each node, in one embodiment, comprises a plurality of processors 202, 204, 206, 208, 210, 212, as shown in FIG. 2. Each of the processors 202, 204, 206, 208, 210, 212 is communicatively coupled to one or more lower level caches 214, 216 such as an L4 cache. Each lower level cache 214, 216 is communicatively coupled to the communication fabrics 110, 112, 114 associated with that node as shown in FIG. 1. It should be noted that even though two lower level caches 214, 216 are shown these two lower level caches 214, 216, in one embodiment, are logically a single cache.

A set of the processors 202, 204, 206 are communicatively coupled to one or more physical memories 219, 221, 223 via a memory port 225, 227, 229. Each processor 204, 206, 208, 210, 212 comprises one or more input/output ports 222, 224, 226, 228, 230, 232, 234, 236. One or more of the processors 202, 212 also comprise service code ports 238, 240 Each processor 204, 206, 208, 210, 212, in one embodiment, also comprises a plurality of processing cores 302, 304, 308 with higher level caches such as L1 and L2 caches, as shown in FIG. 3. A memory controller 310 in a processor 202 communicates with the memory ports 225, 227, 229 to obtain data from the physical memories 219, 221, 223. An I/O controller 312 controls sending and receiving on the I/O ports 222, 224, 226, 228, 230, 232, 234, and 236. A processor 202 on a node 102 also comprises at least one L3 EDRAM cache 314 that is controlled by a cache controller 316. In one embodiment, the L3 EDRAM cache 314 and the L4 cache 212, 214 are shared by all processing cores in the system 100.

The L3 EDRAM cache 314, in one embodiment, is a hierarchical store-in cache structure. Cache accesses are executed under the control of a processing pipe. The pipe is a sequence of processing steps, one per clock cycle, strung together one after another. In each step, in the following called cycle, certain operations are performed e.g. writing data into the cache memory (store) or reading data from the cache memory (fetch).

Dynamically Supporting Variable Cache Array Busy and Access Times

Figure 4:
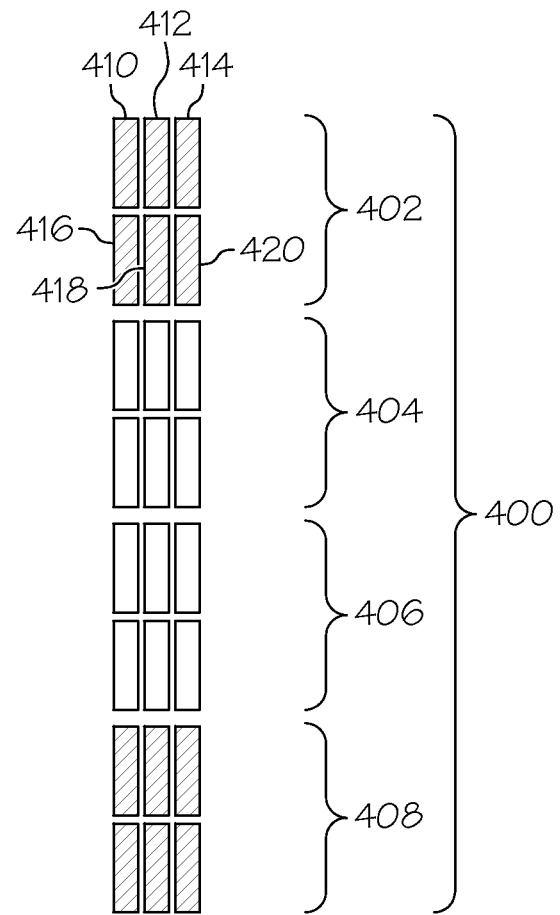
FIG. 4 is a block diagram illustrating one example of an interleave structure according to one embodiment of the present invention.

Various embodiments utilize an interleave organization to segment the L3 EDRAM cache 314. An interleave organization refers to partitioning the cache memory 314 in columns orthogonal to the cache's line structure. Thus, each cache line touches all interleaves. Each interleave is separately addressable. A request, which is passing through a processing pipe, starts at one interleave and proceeds to the next interleave the next cycle until all data has been processed. For example a line fetch requests starts with the interleave holding the line segment, which is needed first, and proceeds to the next interleave until the complete line is read. If the cache's line has 256 bytes and the data to be transferred to and from the cache in segments of 32 bytes, then each interleave would store 32 bytes of a cache line beginning with interleave 0 and line-segment 0. FIG. 4 shows one example of an interleave structure for the L3 EDRAM cache 314. In the example of FIG. 4 an interleave 400 is an octword (32 bytes) that comprises of 4 double words (8 bytes+8 bits ecc) each. This allows for a store-in cache design. A double word is comprised of 6 macros at 12 bits each. Therefore, a double word, in this example, is 72 bits (64 bits+an 8 bit check). It should be noted that various embodiments of the present invention are applicable to any number of interleaves.

Because of the interleaved configuration of the L3 EDRAM cache 314, various embodiments the present invention maintain a model(s)/table(s) of what EDRAMs, i.e., interleaves, are busy at what time for fetch and store operations. This model(s)/table(s) is herein referred to as an "interleave availability table". When a new operation enters the pipeline pre-priority stations 502, 504 (FIG. 5) first check to make sure the targeted interleave is available. If the interleave is available the interleave availability model/table 506 begins calculating how that operation will busy the interleaves in the future.

However, the L3 EDRAM cache 314, in one embodiment, comprises programmable performance parameters such as access time and busy time. For example, the L3 EDRAM cache 314, in one embodiment, can be set to either a 3 cycle busy time or a 4 cycle busy time. This variable busy time, which is not limited to a 3 cycle or 4 cycle busy time, is selectable by a switch 508 (FIG. 5) within the chip 300. Therefore, the interleave availability model/table 506 calculates both the busy time required for the 3 cycle EDRAM busy time as well as the 4 cycle EDRAM busy time. The interleave availability model/table 506 then ingates the correct busy time into the model/table based on the setting of the switch 508 at the time of operation. This allows for a dynamic determination of what the busy time of the operation will be based on the busy time setting.

Figure 5:
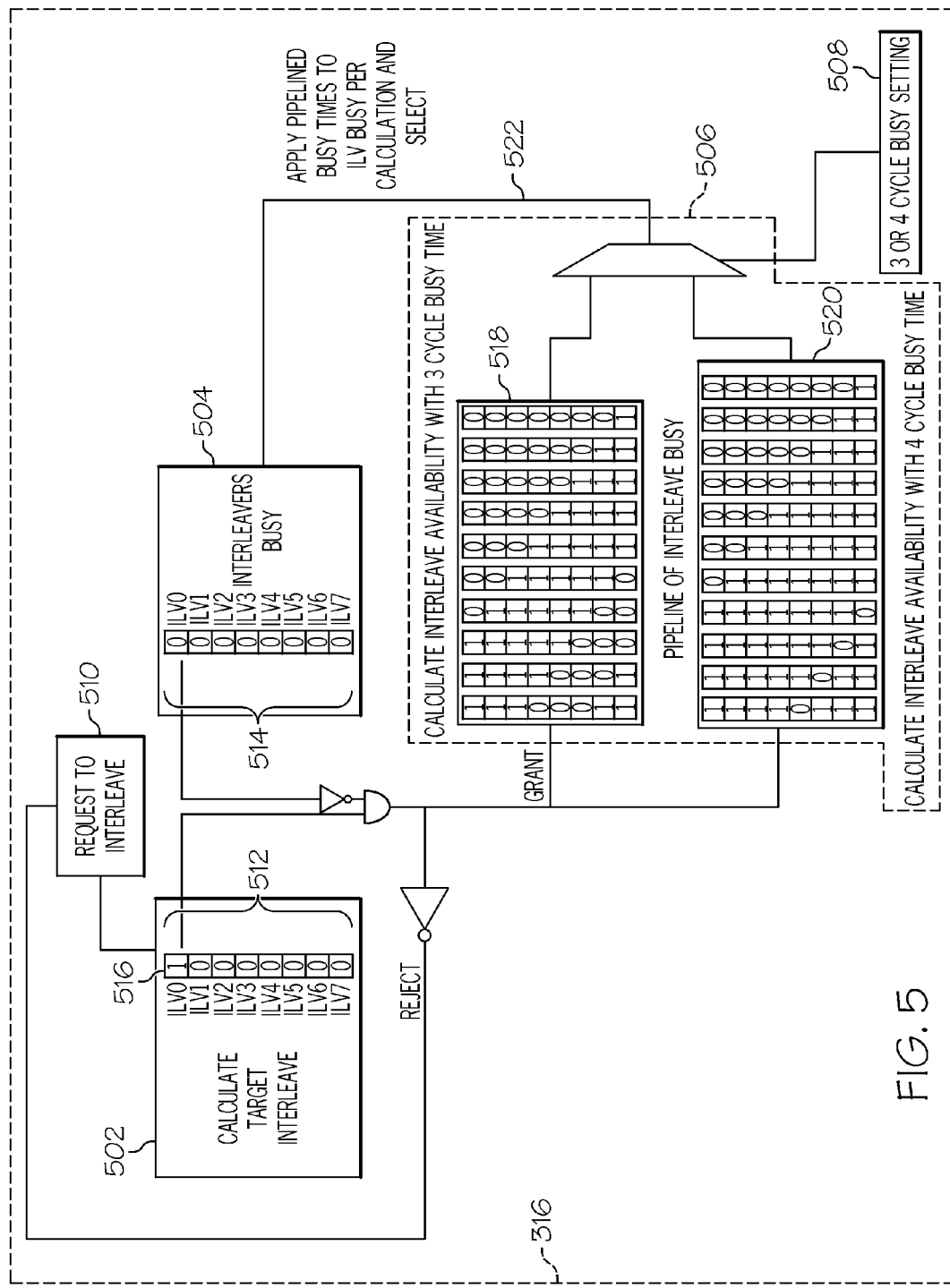
FIG. 5 is a block diagram illustrating one example of a cache controller comprising an interleave availability model/table according to one embodiment of the present invention.

FIG. 5 shows a more detailed view of the cache controller 316 configured to model/table interleave availability for multiple values of a programmable access parameter such as a variable busy time. In pipelined cache access designs each cache access (e.g., a store operation or fetch operation) takes place in a fixed pipe cycle and that each request entering that pipe cycle necessarily performs its cache access. Each cache request passing through the processing pipe checks the interleave model/table by issuing an interleave request 510 before it is allowed to proceed to the actual cache access cycle. In case of an interleave conflict (e.g., the requested interleave is already busy or would collide with another interleave), the cache access request is either rejected from the pipe or the pipe stalls until the request passes the interleave check. When the cache access request passes the interleave check, it reserves the interleaves for the cycles it will use, by putting corresponding reservation information into the interleave model/table. The update of the interleave model/table is performed early in the pipe cycle succeeding the checking cycle such that subsequent requests "see" the new state of the interleave model/table when they check the interleave model/table.

For example, FIG. 5 shows the cache controller 316 receiving a request 510 for an interleave from one or more cache access requests. A first pre-priority station analyzes model/table information 512 to identify the interleave 516 (ILV0 in the example of FIG. 5) based on the interleave request 510. A second pre-priority station 504 analyzes model/table information 514 to determine if the requested targeted interleave, e.g., ILV0 516, is currently busy. If the second pre-priority station 504 determines that the interleave 516 is busy then the request 510 is rejected, as shown in FIG. 5. If the interleave 516 is available the request 510 for the interleave 516 is granted, also shown in FIG. 5.

When an a request 510 for an interleave 516 is granted the interleave availability model/table 506 models/tables both the busy time required for the 3 cycle EDRAM busy time as well as the 4 cycle EDRAM busy time in response to granting the request 510 for the interleave 516. The interleave availability model/table 506 then ingates the correct busy time into the model/table based on the setting of the switch 508 at the time of operation. For example, FIG. 5 shows two models/tables/tables 518, 520, represented here as tables, each representing an interleave availability model/table calculated or adjusted based on granting the interleave request 510 for interleave ILV0 516. The first table 518 represents an interleave availability model/table for a 3 cycle busy time and the second table 520 represents an interleave availability model/table for a 4 cycle busy time. It should be noted that, in one embodiment, fetch operations are initiated earlier in the pipe than store operations. For example, fetch operations are initiated in c1 of the pipe while stores are initiated in c5 of the pipe. Therefore, the interleave availability model/table 506 creates and maintains separate interleave availability models/tables/tables 518, 520 for each type of operation.

Figure 6:
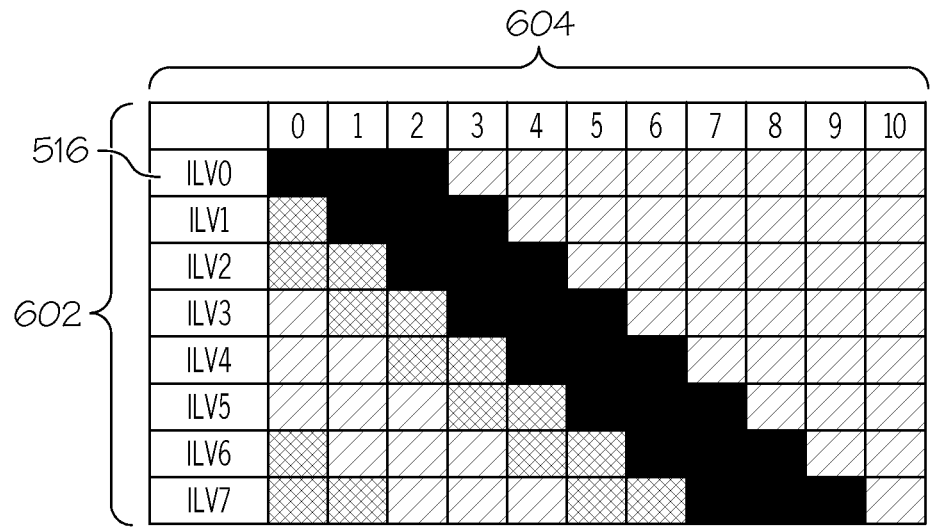
FIG. 6 shows a representation of an interleave availability model/table corresponding to a 3 cycle busy time according to one embodiment of the present invention.
Figure 7:
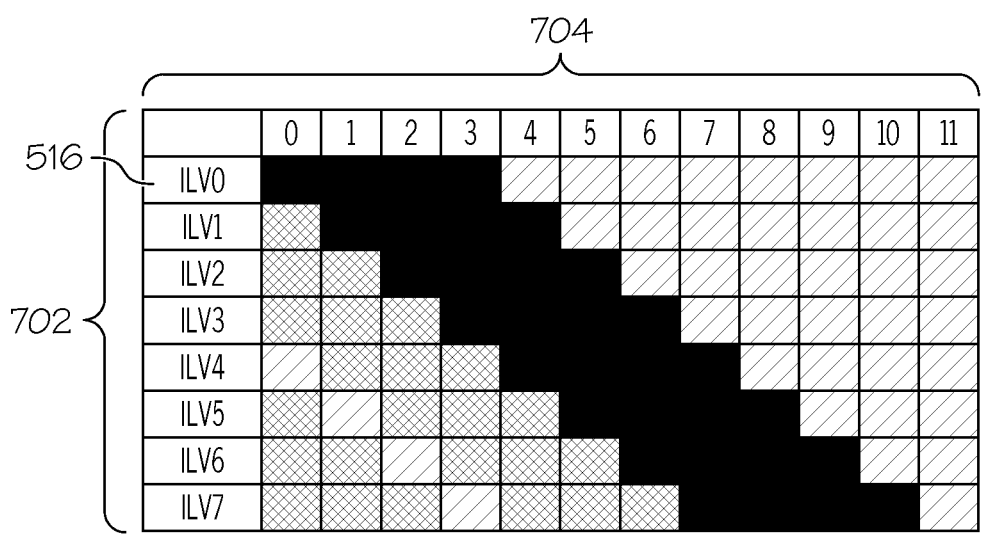
FIG. 7 shows a representation of an interleave availability model/table corresponding to a 4 cycle busy time according to one embodiment of the present invention.

FIGS. 6 and 7 show these models/tables/tables 518, 520, respectively, in greater detail. In particular, FIGS. 6 and 7 shows the interleave and on what pipe cycle that interleave should be prevented from starting an access due to an already scheduled access. The interleaves are labeled in the leftmost column 602, 702 (ILV0 to ILV7) while the cycles are labeled in the topmost row 604, 704. Solid blocks (shown as a "1" in models/tables/tables 518 and 520 of FIG. 5) identify the cycles when the interleave is busy. Blocks with diagonal lines (shown as a "0" in models/tables 518 and 520 of FIG. 5) identify cycles when the interleave is free. Blocks with cross-hatching (shown as a "1" in models/tables 518 and 520 of FIG. 5) identify cycles when the interleave is pre-blocked from having an access to prevent a collision of accesses.

As can be seen from FIG. 6, which represents an interleave availability model/table for a 3 cycle busy time, when the request 510 for interleave ILV0 516 is granted, the interleave availability model/table 506 updates the table 518 to indicate that ILV0 is busy at cycles 0 to 2 and is available at cycles 3-10. ILV1 is pre-blocked for the first cycle, cycle 0, is busy at cycles 1 to 3, and is available at cycles 4 to 10. ILV2 is pre-blocked at cycles 0 to 1, is busy at cycles 2 to 4, and is available at cycles 5 to 10. ILV3 is available at cycle 0, is pre-blocked at cycles 1 to 2, is busy at cycles 3 to 5, and is available at cycles 6 to 10. ILV4 is available at cycles 0 to 1, is pre-blocked at cycles 2 to 3, is busy at cycles 4 to 6, and is available at cycles 7 to 10. ILV5 is available at cycles 0 to 2, is pre-blocked at cycles 3 to 4, is busy at cycles 5 to 7, and is available at cycles 8 to 10. ILV6 is pre-blocked at cycle 0, is available at cycles 1 to 3, is pre-blocked at cycles 4 to 5, is busy at cycles 6 to 8, and is available at cycles 9 to 10. ILV7 is pre-blocked at cycles 0 to 1, is available at cycles 2 to 4, is pre-blocked at cycles 5 to 6, is busy at cycles 7 to 9, and is available at cycle 10. It should be noted that the pre-blocking of ILV6 in cycle 0 and ILV7 in cycles 0 to 1 prevents collisions with interleaves ILV0 and ILV1 since ILV6 and ILV7 wrap back around can collide with ILV0 and ILV1. For example, the pre-block of ILV7 at cycles 0 to 1 prevents a collision with ILV0 when an operation is starting at ILV0 and on the next cycle you have an operation that starts on ILV7. In other words, these pre-blocks prevent a collision on ILV0 cycle2 and ILV1 cycle 3.

FIG. 7 represents an interleave availability for a 4 cycle busy time. When the request 510 for interleave ILV0 516 is granted, the interleave availability model/table 506 updates the table 518 to indicate that ILV0 is busy at cycles 0 to 3 and is available at cycles 4-11. ILV1 is pre-blocked for the first cycle, cycle 0, is busy at cycles 1 to 4, and is available at cycles 5 to 11. ILV2 is pre-blocked at cycles 0 to 1, is busy at cycles 2 to 5, and is available at cycles 6 to 11. ILV3 is pre-blocked at cycles 0 to 2, is busy at cycles 3 to 6, and is available at cycles 7 to 11. ILV4 is available at cycle 0, is pre-blocked at cycles 1 to 3, is busy at cycles 4 to 7, and is available at cycles 8 to 11. ILV5 is pre-blocked at cycle 0, is available at cycle 1, is pre-blocked at cycles 2 to 4, is busy at cycles 5 to 8, and is available at cycles 9 to 11. ILV6 is pre-blocked at cycles 0 to 1, is available at cycle 2, is pre-blocked at cycles 3 to 5, is busy at cycles 6 to 9, and is available at cycles 10 to 11. ILV7 is pre-blocked at cycles 0 to 2, is available at cycle 3, is pre-blocked at cycles 4 to 6, is busy at cycles 7 to 10, and is available at cycle 11. It should be noted that the pre-blocking of ILV6 in cycles 0 to 1 and ILV7 in cycles 0 to 2 prevents collisions with interleave ILV0 and ILV1, as discussed above. Also, the model/table shown in FIG. 7 comprises more pre-blocking than the model/table in FIG. 6 because a 4 cycle busy time requires more pre-blocking than a 3 cycle busy time.

As can be seen from FIGS. 6-7, the interleave availability model/table 506 marks the interleave being target, ILV0 in this example, as busy for a number, n, of cycles equal to the current busy time. Subsequent interleaves are marked as busy for n cycles with an offset of cycle from the previous interleave. With respect to pre-blocking, the interleave availability model/table 506 1.) pre-blocks an interleave for n−1 cycles (if available) immediately prior to the cycle where the interleave is busy, wherein n is equal to the current busy time of the cache 314. Then, 2.) for up to the number of cycles in the model/table, the interleave availability model/table 506 marks a number of cycles up to $|Y-|(2n-1)||$ cycles immediately prior to the n−1 cycles that have been pre-blocked as free, where Y is a selectable number. For example, in FIG. 6 cycles 3 and 4 of ILV5 have been pre-blocked. Therefore, if Y is selected to be 8 then $|8-|(2(3)-1)||=3$ cycles (cycles 0, 1, and 2) immediately prior to cycles 3 and 4 are marked as free. Then 3.) interleave availability model/table 506 pre-blocks a number of cycles (if available) up to MAX(2n−1) immediately prior to the cycles marked as free in 2.). For example, since cycles 2, 3, and 4 for ILV7 in FIG. 6 have been marked as free, a number of cycles up to (2(3)−1)=5 are pre-blocked immediately prior to cycles 2. In the example shown in FIG. 6 only two cycles, cycles 0 and 1, are prior to cycle 2, therefore, only cycles 0 and 1 are pre-blocked.

Once the interleave availability model/table 506 updates the availability models/tables 518, 520, the interleave availability model/table 506 selects one of the models/tables 518, 520 based on the current busy cycle time (e.g., 3 cycles or 4 cycles) as set by the switch 508. The interleave availability model/table 506 presents this information, as shown by line 522, to the pre-priority stations 504, 506. The pre-priority stations 504, 506 identify the interleave being targeted by the request and identify if the interleave is available or busy, as discussed above. If the interleave is available the operation is allowed to proceed normally through the pipe. If the interleave is not available the pipe valid is blocked and the operation waits its target interleave to become available. For example, using the example discussed above with respect to FIG. 6, an operation has been granted access to ILV0. On the next cycle, cycle 1, there is a new operation requesting an interleave. This operation would only be granted access to the cache if it is targeting ILV4, ILV5, or ILV6 since these are the only interleaves available in cycle 1, as shown by the interleave availability model/table of FIG. 6.

Figures 8, 9, 10:
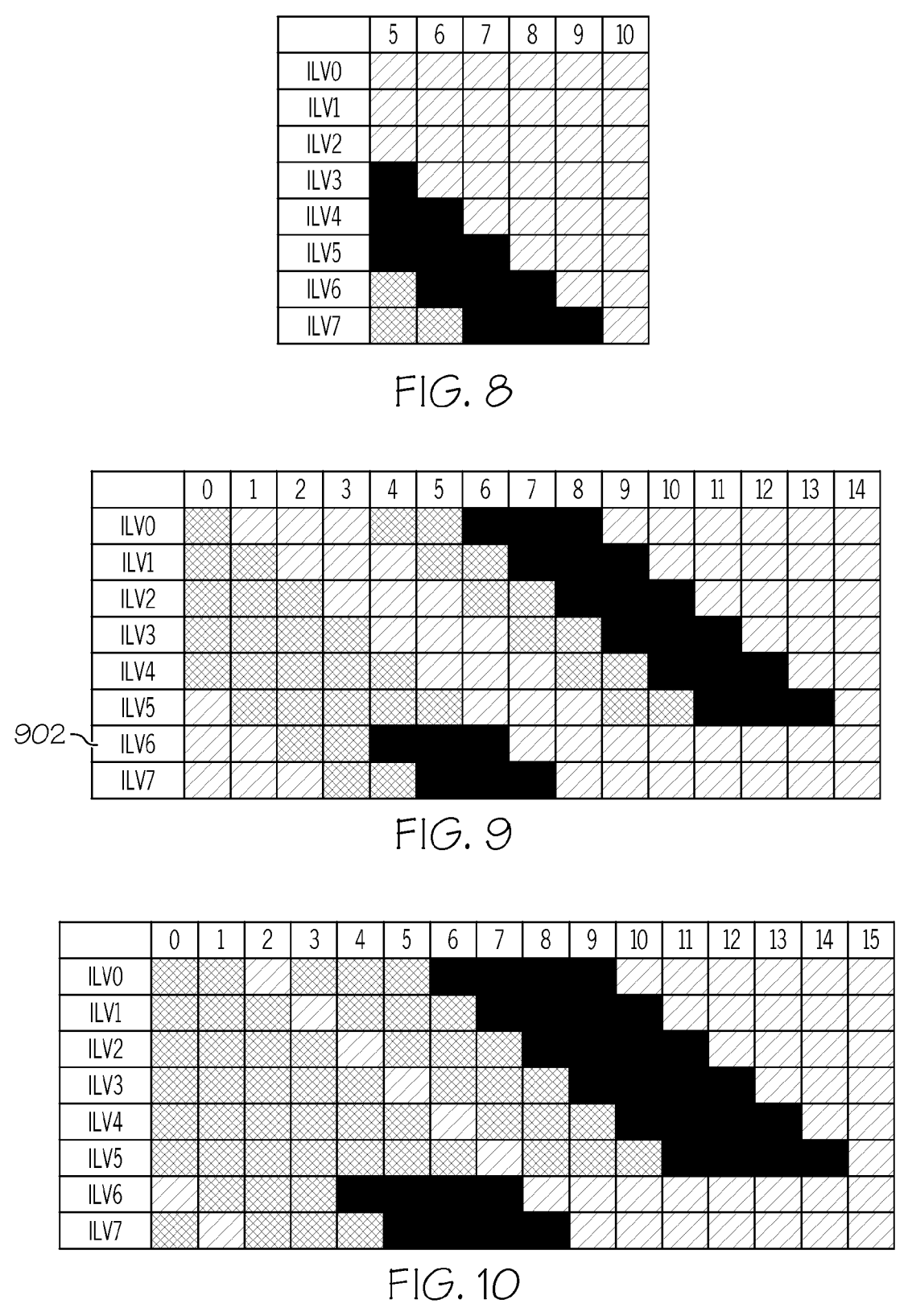

As noted above, in one embodiment, fetch operations are initiated earlier in the pipe than store operations. For example, fetch operations are initiated in c1 of the pipe while stores are initiated in c5 of the pipe. Therefore, a fetch being granted an interleave can affect the interleave availability model/table for a store. FIG. 8 shows one example of this. In particular, FIG. 8 shows how a fetch operation targeting ILV0 affects blocking in a store interleave model/table for a 3 cycle busy. In other words, FIG. 8 shows one example of how the offset (types of operations in the pipe (c1 for a fetch vs. c5 for a store) affects the busy model/table.

As can be seen from FIG. 8, due to the offset of the stores to the fetch in the pipe (5 cycles in this example), only the tail end of the interleave blocking that actually blocks the stores is shown. All store blocking due to a fetch can be constructed by taking all the blocking starting at the cycle 5 column and applying that to stores. In other words, the interleave availability models/tables for stores can be updated to show blocking based on the columns starting at cycle 5 (which is the offset in this example) in the fetch interleave availability model/table. This also applies to stores and how they affect the fetch interleave availability models/tables. For example, FIGS. 9-10 shows how a fetch interleave availability model is affected by a store targeting ILV6 with a 3 cycle busy time and a 4 cycle busy time, respectively.

In particular, FIG. 9 shows that since the store is targeting ILV6 902. Because a store, in one example, starts on the fifth cycle in the pipeline, FIG. 9 shows ILV6 902 being set as busy for cycles 4 to 6. Since fetches occur in cycles prior to the store, the interleave availability model/table 506 pre-blocks the earlier cycles, as shown in FIG. 6 by the cross-hatched boxes to the left of the free cycles (i.e., the diagonal boxes). FIG. 10 is similar to FIG. 9 except that the busy time is set to 4 cycles.

Also, it should be noted that the cache 314 is able to switch between busy times. Therefore, when the cache 314 switches from one busy time to another the caches "quiesce" until the last operation has completed. This is prevents a collision between the operations. Operations to the cache are quiesced by making all of the interleaves look busy until the last real operation is completed. Then the cache 314 is able to perform operations at the new busy time.

Additionally the cache 314 has the ability to deliver data at different latencies based on results from real hardware. The cache 314 tries to achieve a faster latency so that the data is returned faster leading to improved performance but the access time must be such that the EDRAMs can safely retrieve data from their cells. Since the requestors to the cache 314 are expecting the data to be returned at a fixed time the responses are delayed from the cache 314 to match the latency setting, which is variable, of the cache 314 at any given time.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Operational Flow Diagrams

Figure 11:
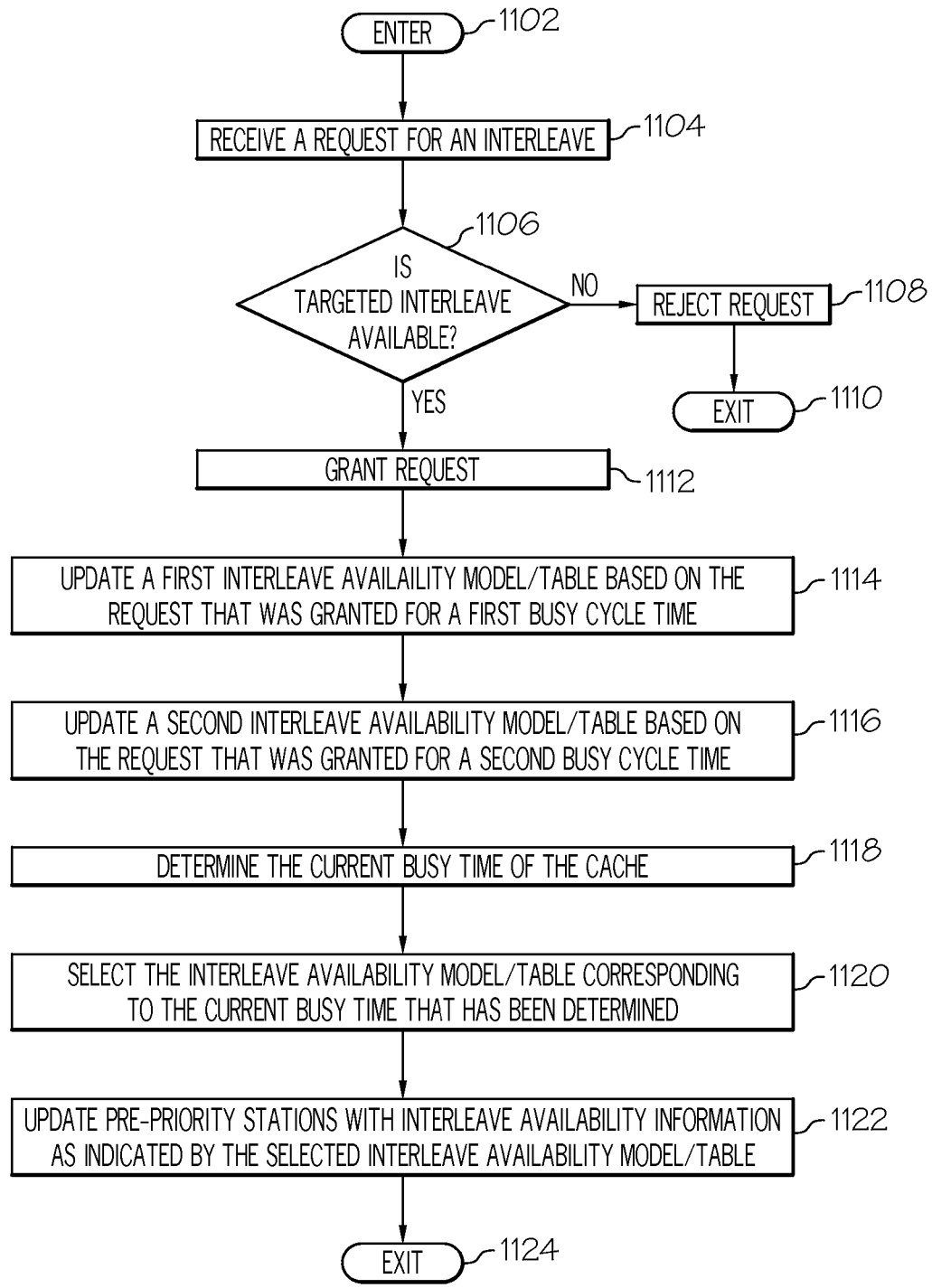
FIG. 11 is an operational flow diagram illustrating one example of a process for managing access to a cache comprising variable performance parameters according to one embodiment of the present invention.
Figure 12:
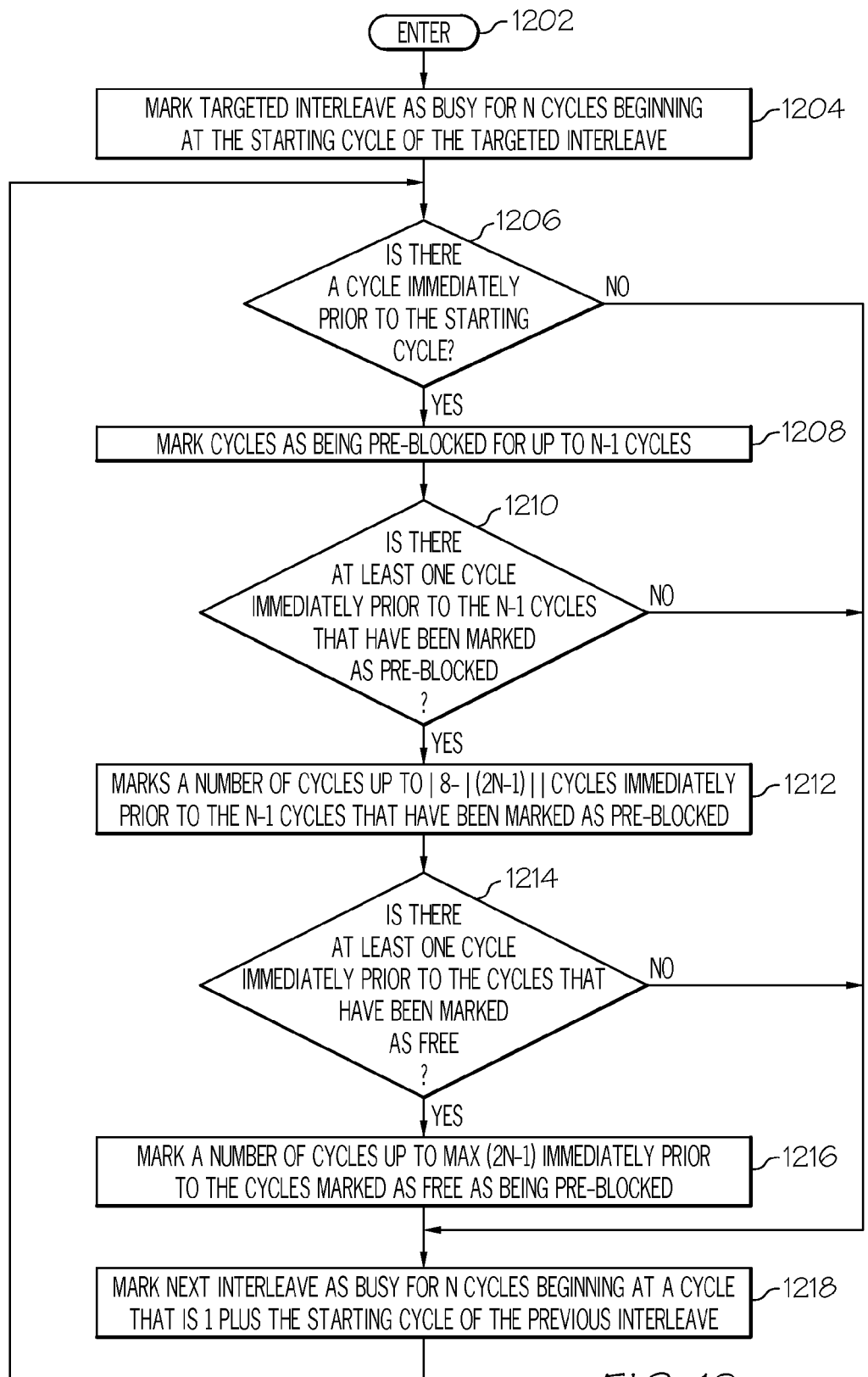
FIG. 12 is an operational flow diagram illustrating one example of a process for updating interleave availability models/tables/tables for a cache comprising variable busy times according to one embodiment of the present invention.

Referring now to FIGS. 11 and 12, the flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 11 is an operational flow diagram illustrating one example of managing access to a cache comprising variable performance parameters. The operational flow diagram of FIG. 11 begins at step 1102 and flows directly to step 1104. The cache controller 316, at step 1104, receives a request 510 for an interleave 516. A pre-priority station 504, at step 1106, determines if the targeted interleave 516 is available. If the result of this determination is negative, the cache controller 316, at step 1108, rejects the request and the control flow exits at step 1110. If the result of this determination is positive, the cache controller 316, at step 1112, grants the request.

The interleave availability model/table 506, at step 1114, updates a first interleave availability model/table 518 based on the request that was granted for a first busy cycle time. The interleave availability model/table 506, at step 1116, updates a second interleave availability model/table 520 based on the request that was granted for a second busy cycle time. The interleave availability model/table 506, at step 1118, determines the current busy time set for the cache 314 as indicated by a switch 508. The interleave availability model/table 506, at step 1120, selects the interleave availability model/table 518, 520 corresponding to the current busy time that has been determined. The interleave availability model/table 506, at step 1122, updates the pre-priority stations 502, 504 with interleave availability information as indicated by the selected interleave availability model/table 518, 520. The control flow then exits at step 1124.

FIG. 12 is an operational flow diagram illustrating updating an interleave availability model. It should be noted that the process shown in FIG. 12 is performed for each busy time available for the cache 314. The operational flow diagram of FIG. 12 begins at step 1202 and flows directly to step 1204. The interleave availability model/table 506, at step 1204, marks the targeted interleave 516 as busy for n cycles (where n is equal to a busy time of the cache 314) at the starting cycle of the targeted interleave 516. The interleave availability model/table 506, at step 1206, determines if there is a cycle immediately prior to the starting cycle. If the result of this determination is negative, the control flows to step 1220. If the result of this determination is positive, the interleave availability model/table 506, at step 1208, marks a number of cycles immediately prior to the starting cycle up to n−1 cycles as being pre-blocked.

The interleave availability model/table 506, at step 1210, determines if there is at least once cycle immediately prior to the n−1 cycles that have been marked as pre-blocked. If the result of this determination is negative, the control flows to step 1220. If the result of this determination is positive, the interleave availability model/table 506, at step 1214, marks a number of cycles up to |8−|(2n−1)|| cycles immediately prior to the n−1 cycles that have been marked as pre-blocked. The interleave availability model/table 506, at step 1216, determines is there is at least one cycle immediately prior to the cycles that have been marked as free. If the result of this determination is negative, the control flows to step 1220. If the result of this determination is positive, the interleave availability model/table 506, at step 1218, marks a number of cycles up to MAX(2n−1) immediately prior to the cycles marked as free as being pre-blocked, where MAX indicates that this is the maximum number of cycles that can be marked in this step. The interleave availability model/table 506, at step 1220, marks the next interleave as busy for n cycles beginning at a cycle that is 1 plus the starting cycle of the previous interleave. The control then flows back to step 1206 where steps 1206 to 1220 are repeated for each remaining interleave.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a computer readable storage medium or a program product via CD or DVD, e.g. CD, CD-ROM, or other form of recordable media, and/or according to alternative embodiments via any type of electronic transmission mechanism.

What is claimed is:

1. A method for managing access to a cache memory, the method comprising:
   receiving a request for a targeted interleave within a cache memory, wherein the request is associated with an operation of a given type;
   determining that the targeted interleave is available;
   granting, based on the determining, the request;
   updating, based on the granting, a first interleave availability table associated with a first busy time selectable for the cache memory based on the operation associated with the request, wherein the first busy time indicates a first given number of cycles an interleave is busy during the operation; and
   updating, based on the granting, a second interleave availability table associated with a second busy time selectable for the cache memory based on the operation associated with the request, wherein the second busy time indicates a second given number of cycles an interleave is busy during the operation, and wherein the first given number of cycles is different than the first given number of cycles.

2. The method of claim 1, wherein the cache memory is an embedded dynamic random access memory (EDRAM) cache, and further comprising:
   determining that the cache memory is set to the first busy time; and
   selecting the first interleave availability table.

3. The method of claim 1, wherein the cache memory is an embedded dynamic random access memory (EDRAM) cache, and further comprising:
   determining that the cache memory is set to the second busy time; and
   selecting the second interleave availability table.

4. The method of claim 1, wherein the cache memory is an embedded dynamic random access memory (EDRAM) cache, and wherein updating the first interleave availability table and the second interleave availability table further comprises:
   marking the targeted interleave and a remaining set of interleaves as busy for n cycles beginning at a starting cycle of the targeted interleave and each interleave in the set of interleaves, where n is equal to one or the first busy time and the second busy time.

5. The method of claim 4, wherein the cache memory is an embedded dynamic random access memory (EDRAM) cache, and wherein updating the first interleave availability table and the second interleave availability table further comprises:
   determining that there is at least one cycle immediately prior to the starting cycle; and
   marking, the determining, a number of cycles, immediately prior to the starting cycle, less than or equal to n−1 cycles as being pre-blocked.

6. The method of claim 5, wherein the cache memory is an embedded dynamic random access memory (EDRAM) cache, and wherein updating the first interleave availability table and the second interleave availability table further comprises:
   determining that there is at least one cycle immediately prior to a first cycle in the number of cycles marked as pre-blocked; and
   marking, based on the determining, a number of cycles, immediately prior to the first cycle in the number of cycles marked as pre-blocked, less than or equal to |Y−|(2n−1)|| as being free, where Y is a selectable number.

7. The method of claim 6, wherein the cache memory is an embedded dynamic random access memory (EDRAM) cache, and wherein updating the first interleave availability table and the second interleave availability table further comprises:
   determining that there is at least one cycle immediately prior to a first cycle in the number of cycles marked as free; and
   marking, based on the determining, a number of cycles, immediately prior to the first cycle in the number of cycles marked as free, less than or equal to 2n−1 as being pre-blocked.

8. An information processing device for managing access to a cache memory, the information processing device comprising:
   a plurality of processing cores;
   at least one memory cache communicatively coupled to the plurality of processing cores; and
   at least one cache controller communicatively coupled to the at least one memory cache and the plurality of processing cores, wherein the at least one cache controller is configured to perform a method comprising:
      receiving a request for a targeted interleave within a cache memory, wherein the request is associated with an operation of a given type;
      determining that the targeted interleave is available;
   granting, based on the determining, the request;
      updating, based on the granting, a first interleave availability table associated with a first busy time selectable for the cache memory based on the operation associated with the request, wherein the first busy time indicates a first given number of cycles an interleave is busy during the operation; and
      updating, based on the granting, a second interleave availability table associated with a second busy time selectable for the cache memory based on the operation associated with the request, wherein the second busy time indicates a second given number of cycles an interleave is busy during the operation, and wherein the first given number of cycles is different than the first given number of cycles.

9. The information processing device of claim 8, wherein the cache memory is an embedded dynamic random access memory (EDRAM) cache, and the method further comprising:
   determining that the cache memory is set to the first busy time; and
   selecting the first interleave availability table.

10. The information processing device of claim 8, wherein the cache memory is an embedded dynamic random access memory (EDRAM) cache, and the method further comprising:
   determining that the cache memory is set to the second busy time; and
   selecting the second interleave availability table.

11. The information processing device of claim 8, wherein the cache memory is an embedded dynamic random access memory (EDRAM) cache, and wherein updating the first interleave availability table and the second interleave availability table further comprises:
  marking the targeted interleave and a remaining set of interleaves as busy for n cycles beginning at a starting cycle of the targeted interleave and each interleave in the set of interleaves, where n is equal to one or the first busy time and the second busy time.

12. The information processing device of claim 11, wherein the cache memory is an embedded dynamic random access memory (EDRAM) cache, and wherein updating the first interleave availability table and the second interleave availability table further comprises:
  determining that there is at least one cycle immediately prior to the starting cycle; and
  marking, based on the determining, a number of cycles, immediately prior to the starting cycle, less than or equal to n−1 cycles as being pre-blocked.

13. The information processing device of claim 12, wherein the cache memory is an embedded dynamic random access memory (EDRAM) cache, and wherein updating the first interleave availability table and the second interleave availability table further comprises:
  determining that there is at least one cycle immediately prior to a first cycle in the number of cycles marked as pre-blocked; and
  marking, based on the determining, a number of cycles, immediately prior to the first cycle in the number of cycles marked as pre-blocked, less than or equal to $|Y-(2n-1)|$ as being free, where Y is a selectable number.

14. The information processing device of claim 13, wherein the cache memory is an embedded dynamic random access memory (EDRAM) cache, and wherein updating the first interleave availability table and the second interleave availability table further comprises:
  determining that there is at least one cycle immediately prior to a first cycle in the number of cycles marked as free; and
  marking, based on the determining, a number of cycles, immediately prior to the first cycle in the number of cycles marked as free, less than or equal to 2n−1 as being pre-blocked.

15. A computer program product for managing access to a cache memory, the computer program product comprising:
  a non-transitory storage medium readable by a processing circuit and storing instructions for execution by the processing circuit for performing a method comprising:
  receiving a request for a targeted interleave within a cache memory, wherein the request is associated with an operation of a given type;
  determining that the targeted interleave is available;
  granting, based on the determining, the request;
  updating, based on the granting, a first interleave availability table associated with a first busy time selectable for the cache memory based on the operation associated with the request, wherein the first busy time indicates a first given number of cycles an interleave is busy during the operation; and
  updating, based on the granting, a second interleave availability table associated with a second busy time selectable for the cache memory based on the operation associated with the request, wherein the second busy time indicates a second given number of cycles an interleave is busy during the operation, and wherein the first given number of cycles is different than the first given number of cycles.

16. The computer program product of claim 15, wherein the cache memory is an embedded dynamic random access memory (EDRAM) cache, and the method further comprising one:
  determining that the cache memory is set to the first busy time and selecting the first interleave availability table; and
  determining that the cache memory is set to the second busy time and selecting the second interleave availability table.

17. The computer program product of claim 15, wherein the cache memory is an embedded dynamic random access memory (EDRAM) cache, and wherein updating the first interleave availability table and the second interleave availability table further comprises:
  marking the targeted interleave and a remaining set of interleaves as busy for n cycles beginning at a starting cycle of the targeted interleave and each interleave in the set of interleaves, where n is equal to one or the first busy time and the second busy time.

18. The computer program product of claim 17, wherein the cache memory is an embedded dynamic random access memory (EDRAM) cache, and wherein updating the first interleave availability table and the second interleave availability table further comprises:
  determining that there is at least one cycle immediately prior to the starting cycle; and
  marking, based on the determining, a number of cycles, immediately prior to the starting cycle, less than or equal to n−1 cycles as being pre-blocked.

19. The computer program product of claim 18, wherein the cache memory is an embedded dynamic random access memory (EDRAM) cache, and wherein updating the first interleave availability table and the second interleave availability table further comprises:
  determining that there is at least one cycle immediately prior to a first cycle in the number of cycles marked as pre-blocked; and
  marking, based on the determining, a number of cycles, immediately prior to the first cycle in the number of cycles marked as pre-blocked, less than or equal to $|Y-(2n-1)|$ as being free, where Y is a selectable number.

20. The computer program product of claim 19, wherein the cache memory is an embedded dynamic random access memory (EDRAM) cache, and wherein updating the first interleave availability table and the second interleave availability table further comprises:
  determining that there is at least one cycle immediately prior to a first cycle in the number of cycles marked as free; and
  marking, based on the determining, a number of cycles, immediately prior to the first cycle in the number of cycles marked as free, less than or equal to 2n−1 as being pre-blocked.

* * * * *